DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1213

T892,017

METHOD OF REDUCING MELT LOSS IN DIE CASTING MAGNESIUM BASE ALLOYS

Stephen C. Erickson and John N. Reding, Midland, Mich., assignors to The Dow Chemical Company, Midland, Mich.

Filed Nov. 27, 1970, Ser. No. 116,694
Int. Cl. B22d *27/10*
U.S. Cl. 164—72
No Drawing. 7 Pages Specification

The present invention relates to improvements in a method of die casting magnesium base alloys to reduce melt loss. Such improvements comprise employing certain magnesium base alloys and/or lubricants, the latter being controlled in quantity and/or place of application so as to inhibit the formation of a material, presumably manganese-carbon particles, which stabilizes the flux-metal emulsion in the magnesium alloy melt being die cast. It has been discovered that such stabilizer material surrounds or entraps metal globules in the sludge layer of the magnesium alloy melt causing a high melt loss. Such stabilizers can be avoided by the present method by, for example, using a magnesium base alloy with a low manganese content when an oil base lubricant is employed; applying lubricant to the die surface or die plunger rather than to the shot well of the die casting machine; using a non-carbonaceous lubricant; or reducing the amount of lubricant normally used in the die casting operation.